US012617150B2

(12) United States Patent
Kanagaraj et al.

(10) Patent No.: US 12,617,150 B2
(45) Date of Patent: May 5, 2026

(54) APPARATUS AND SYSTEM FOR DEPOSITING FIBER MATERIAL

(71) Applicant: FABHEADS AUTOMATION PRIVATE LIMITED, Chennai (IN)

(72) Inventors: Dhinesh Kanagaraj, Chennai (IN); Akshay Ballal, Chennai (IN); Srinath Ramesh, Chennai (IN)

(73) Assignee: FABHEADS AUTOMATION PRIVATE LIMITED, Chennai (IN)

( * ) Notice: Subject to any disclaimer, the term of this patent is extended or adjusted under 35 U.S.C. 154(b) by 0 days.

(21) Appl. No.: 18/030,279

(22) PCT Filed: Aug. 6, 2021

(86) PCT No.: PCT/IN2021/050753
§ 371 (c)(1),
(2) Date: Apr. 5, 2023

(87) PCT Pub. No.: WO2022/029804
PCT Pub. Date: Feb. 10, 2022

(65) Prior Publication Data
US 2024/0025134 A1      Jan. 25, 2024

(51) Int. Cl.
*B29C 64/209*          (2017.01)
*B29C 35/08*           (2006.01)
(Continued)

(52) U.S. Cl.
CPC ........ *B29C 64/209* (2017.08); *B29C 35/0805* (2013.01); *B29C 64/118* (2017.08);
(Continued)

(58) Field of Classification Search
CPC ..................................................... B29C 64/118
See application file for complete search history.

(56) References Cited

U.S. PATENT DOCUMENTS 8,827,684 B1 *   9/2014   Schumacher ......... B29C 64/118
                                                          425/375
10,434,702 B2 *  10/2019  Mark ..................... B29C 48/92
                        (Continued)

FOREIGN PATENT DOCUMENTS

CN          105579220 A  *  5/2016   ............. B33Y 30/00
CN          106378935 A  *  2/2017   ............. B33Y 30/00
                        (Continued)

*Primary Examiner* — Atul P. Khare
(74) *Attorney, Agent, or Firm* — Jose Cherson Weissbrot

(57)                    ABSTRACT
An apparatus (100), assembly and process for depositing fiber material on a surface (131) is provided herein. The apparatus (100) comprises an material extruder (101) having a clutching mechanism configured to engage a fiber material with a extruder motor that is configured to feed said fiber material into a filament guide. The apparatus (100) further includes a modular layup nozzle (109) comprising a cold end portion (110), hot end portion (116) and output nozzle (108). The cold end portion (110) is configured to receive said fiber material and cool down the temperature thereof by using a coolant before said fiber material enters a hot end portion (116) of the apparatus (100). The hot end portion (116) further comprises a heat block (118) that is configured to convert the fiber material into a molten form and deposit said fiber material into a composite part (131) through a output nozzle (108). The fiber material is then cut by a cutting assembly (103) after a deposit operation is complete.

25 Claims, 18 Drawing Sheets

(51) Int. Cl.

| | |
|---|---|
| *B29C 64/118* | (2017.01) |
| *B29C 64/194* | (2017.01) |
| *B29C 64/30* | (2017.01) |
| *B29C 70/38* | (2006.01) |
| *B29C 70/54* | (2006.01) |
| *B29C 64/295* | (2017.01) |
| *B33Y 10/00* | (2015.01) |

(52) U.S. Cl.
CPC ............ *B29C 64/194* (2017.08); *B29C 64/30* (2017.08); *B29C 70/384* (2013.01); *B29C 70/545* (2013.01); *B29C 2035/0822* (2013.01); *B29C 64/295* (2017.08); *B33Y 10/00* (2014.12)

(56) References Cited

U.S. PATENT DOCUMENTS

| | | | | |
|---|---|---|---|---|
| 10,682,796 | B2 * | 6/2020 | Mandel | ................ B29C 64/118 |
| 10,843,451 | B2 * | 11/2020 | Miller | ................... B29C 64/209 |
| 10,875,244 | B2 * | 12/2020 | Montgomery | ......... B33Y 30/00 |
| 11,086,296 | B2 * | 8/2021 | Adair | ................. G05B 19/4145 |
| 11,167,493 | B2 * | 11/2021 | Erdman | ................ B29C 64/209 |
| 11,179,869 | B2 * | 11/2021 | Huff | ..................... B29C 35/0805 |
| 11,577,462 | B2 * | 2/2023 | Mark | ..................... B33Y 30/00 |
| 12,220,842 | B2 * | 2/2025 | Kanagaraj | .................. C08J 5/06 |
| 2015/0266243 | A1 | 9/2015 | Mark et al. | |
| 2016/0176108 | A1 * | 6/2016 | Tadin | ..................... B33Y 30/00 |
| | | | | 425/375 |
| 2017/0157826 | A1 * | 6/2017 | Hishiki | ................. B29C 48/266 |
| 2017/0232674 | A1 | 8/2017 | Mark | |
| 2018/0207869 | A1 * | 7/2018 | Lee | ....................... B29C 64/241 |
| 2018/0345577 | A1 * | 12/2018 | Takeyama | ............. B29C 64/118 |
| 2019/0009472 | A1 * | 1/2019 | Mark | .................... B29C 64/393 |
| 2019/0168455 | A1 * | 6/2019 | Besim | ................... B29C 64/118 |
| 2020/0139624 | A1 * | 5/2020 | Khondoker | .......... B29C 64/118 |
| 2022/0161490 | A1 * | 5/2022 | Jain | ....................... B29C 64/218 |
| 2023/0391021 | A1 * | 12/2023 | Kanagaraj | ............. B33Y 10/00 |

FOREIGN PATENT DOCUMENTS

| | | | | | |
|---|---|---|---|---|---|
| CN | 108582764 | A | * | 9/2018 | .......... B29C 64/321 |
| DE | 102015012706 | A1 | * | 4/2017 | .......... B29C 64/118 |

* cited by examiner

APPARATUS AND SYSTEM FOR DEPOSITING FIBER MATERIAL

FIELD OF THE INVENTION

The embodiments herein generally relate to systems and methods for forming a composite layup by depositing fiber material onto a substrate. The embodiments herein more particularly relate to an apparatus (100) with a material extruder (101) that has multiple modes of operation and a modular layup nozzle (109) that has a versatile configuration capable of accommodating different forms of fiber material.

BACKGROUND

The market of high strength but low weight materials, collectively known as composite materials, has known a significant growth over the past years, evolving from the development of plastics such as vinyl, polystyrene, phenolic and polyester, to the introduction of fiberglass and thus combination thereof. Composites are produced by combining one material, otherwise known as matrix or binder, with fibers or fragments of a stronger material, typically referred as reinforcement. Manufacturing process depends mainly on the properties (i.e. tensile strength, impact strength, fatigue resistance, etc.) that are desired to be incorporated in the resulting composite material.

Conventional manufacturing methods of composite materials generally involve a molding process wherein the reinforcement material is placed in a mold and the matrix, typically in a semi-liquid form, is sprayed or pumped in. Another process involved is curing wherein pressure and heat are applied to the molded matrix with reinforcement in order to force out any bubbles and make the matrix set solid. The manufacturing process is usually done manually making it labor intensive and causes a substantial increase in production lead time. Automated composites manufacturing (ACM) involving sophisticated apparatus (100) may be possible but entails high upfront cost and requires elaborate maintenance.

A widely known ACM process is automated fiber placement (AFP) wherein synthetic resin pre-impregnated fibers, also referred as pre-pegs, are applied on complex tooling surfaces to form a bundle of fibers, otherwise called as tows, and are later on compacted and heated to produce two-dimensional (2D) or 3D laminates. However, due to technical limitations such as complexity of parts and sophisticated machineries that are difficult to scale down, AFP is not suitable for manufacture of all types of products. In addition, AFP requires the use of molds, storage of pre-pegs in controlled environment, high-cost resins and significant amount of post processing for products formed, thereby resulting to a combination of high investment costs and low productivity. As a result, manual manufacturing methods are commonly utilized for the production of complex-shaped products in low to medium production volumes.

Thus, a cost-friendly process that solves the above-mentioned problems associated with manual and automated composite manufacturing processes is highly desired.

It is, therefore, a primary object of the present invention to provide an apparatus (100) suitable for use in a cost-efficient process of manufacturing a composite material, including complex-shaped products.

SUMMARY

The object is achieved by providing an apparatus (100) for depositing fiber material onto a surface (131) comprising:

a material extruder (101) comprising a clutching mechanism configured to engage a fiber material with an extruder motor that is configured to feed said fiber material into a filament guide;

a modular layup nozzle (109) comprising a cold end portion (110) that is configured to receive said fiber material and cool down the temperature of said fiber material by using a liquid as coolant; a hot end portion (116) comprising a heat block (118) that is configured to convert the fiber material into a molten form and deposit said fiber material into a composite part (134) through an output nozzle (108); and a cutting assembly (103 Configured to cut said fiber material after a deposit operation is completed.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (z.e., meaning having the potential to), rather than the mandatory sense (z.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Figure 1:
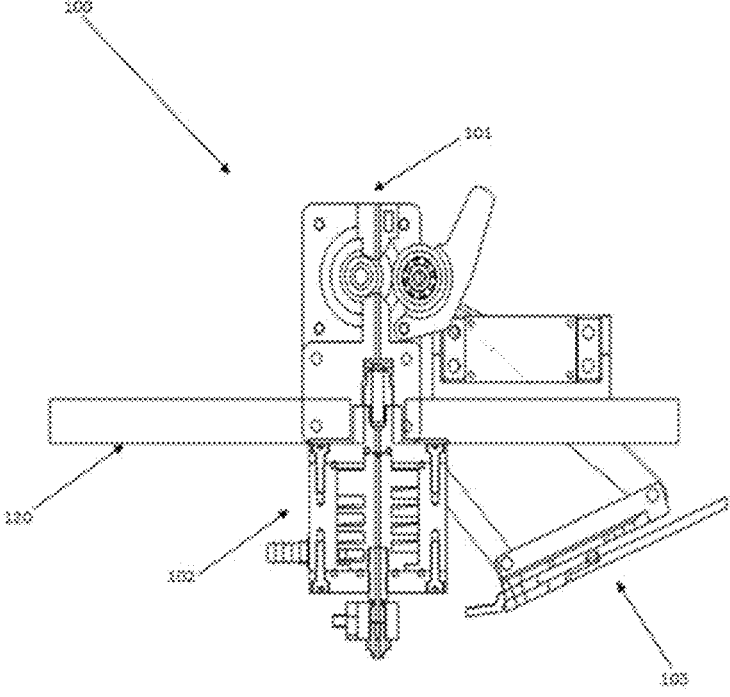
FIG. 1 illustrates an embodiment of an apparatus (100) for depositing fiber material onto a surface (131) of the present invention.

FIG. 1 illustrates an embodiment of an apparatus (100) for depositing fiber material onto a surface (not shown) according to the present invention. As shown in FIG. 1, the apparatus (100) comprises a material extruder (101), a modular layup nozzle (102) and a cutting assembly (103).

Figure 2A:
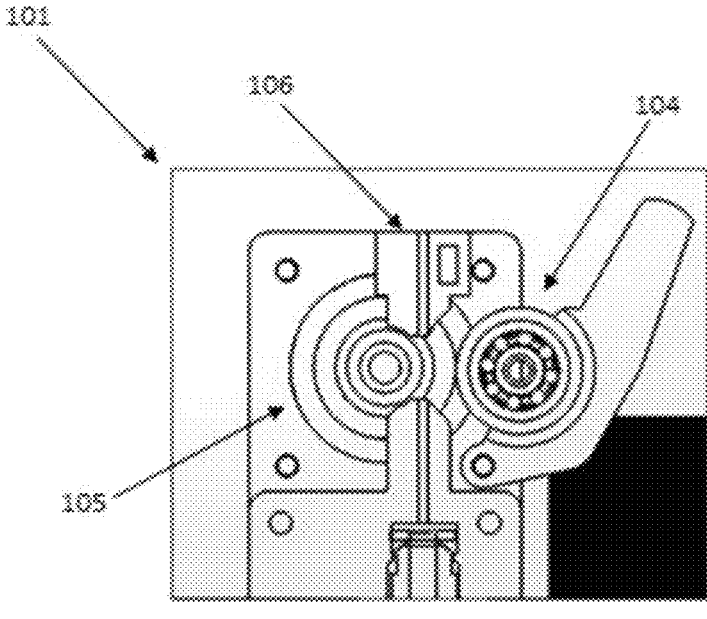
FIG. 2A-2B illustrates an embodiment of a material extruder (101) of the apparatus (100) of the present invention.
Figure 2B:
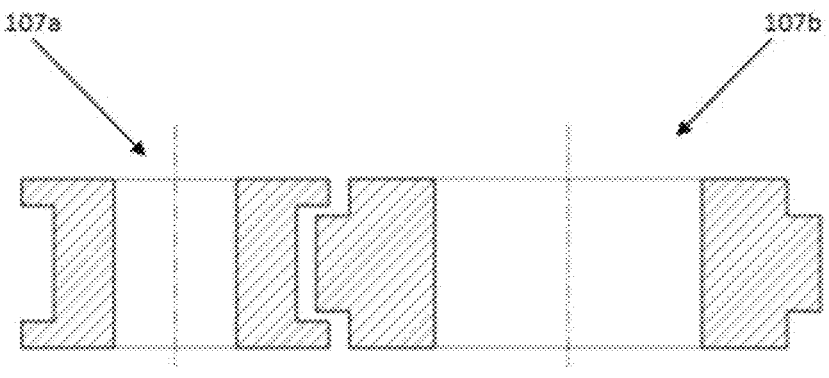

FIG. 2A-2B illustrate an embodiment of the material extruder (101) of the apparatus (100). As shown in FIG. 2A, the material extruder (101) comprises a clutching mechanism (104) configured to engage a fiber material with an extruder motor (105) that is configured to feed said fiber material into a filament guide (106).

It is conceivable that the fiber material, in particular a fiber reinforced filament, is essentially a roving of continuous fiber material pre-impregnated with thermoplastic material. The cross section of said fiber material may be circular, rectangular or any other shape depending on the feed system and the output desired. In order to accommodate a variety of fiber materials, the filament guide (106) is conceived to have various cross sections, say for example, a curvilinear geometric shape, such as circular, or a polygonal geometric shape, such as rectangular.

It is possible that the clutching mechanism (104) is operated remotely through a controller (not shown). It is conceivable that the clutching mechanism (104) is a material clamp. Upon activation, the clutching mechanism (104) pivots about (a) and engages the fiber material with the extruder motor (105) during operation and disengages said fiber material and extruder motor (105) upon completion of a deposit operation.

It is also conceived that the extruder motor (105) is set to be engaged when a new fiber material is fed into the material extruder (101) or when the fiber material needs to be retracted after cutting operation. In addition, the extruder motor (105) is engaged when a new cycle of deposit operation takes place.

The material extruder (101) is inoperable or remains disengaged during the deposit operation. This prevents unwanted tensioning of the fiber material due to velocity mismatch, extruder slippage, which could lead to the fiber material being pulled out from a part, nozzle clogging and even breakage.

As shown in FIG. 2B, in a possible embodiment, the material extruder (101) comprises mated extruding pulleys (107), say for example a driving pulley (107a) and an idling pulley (107b). Such configuration of the material extruder (101) prevents the fiber material from slipping out during operation and allows for acceptance of deposited fiber materials, otherwise referred as tows, in various forms including round fiber materials.

In a preferred embodiment of the present invention, the apparatus (100) can move along four axes. For layup in different directions and steering, a fourth axis of rotation can be added to orient the fiber material along the desired path. This allows the material extruder (101) to operate in three modes: push mode, pull mode and combination mode. Push mode is ideal for use in feeding new fiber material where the fiber material is pushed through the output nozzle (not shown). During cutting operation in the push mode, the fiber material is pushed to release tension therein. Pull mode is ideal for use in straight line layouts. During pull mode, the material extruder (101) is disengaged to allow for fasted layup speeds. Combination mode is ideal for use in curved sections. During combination mode, the fiber material is alternatively pushed and pulled to improve precision during steering.

FIG. 3A-3D illustrate the modular layup nozzle (102) according to the present invention. This modular layup nozzle (102) can be swapped easily for performing layup with different widths of fiber material and also those having a circular cross-section.

Figure 3A:
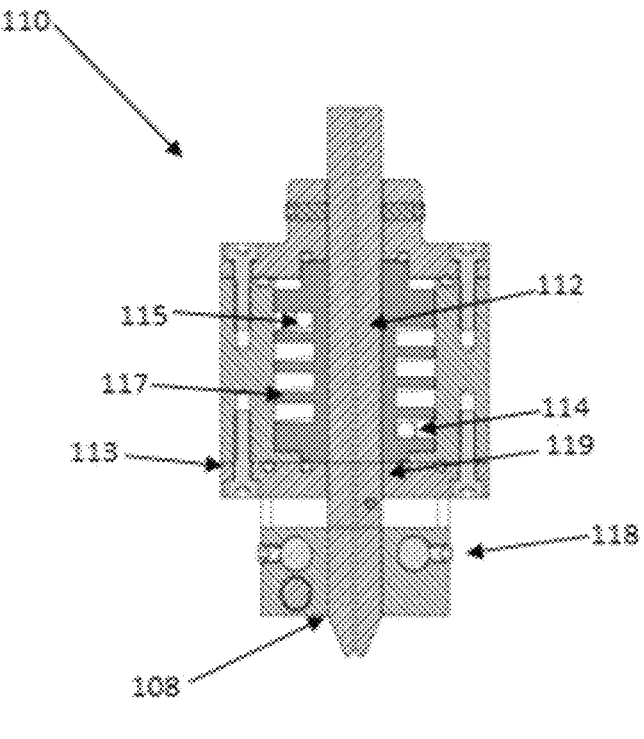
FIG. 3A illustrates an embodiment of a cold end portion (110) of the apparatus (100) of the present invention.

FIG. 3A shows the cold end portion (110) of the modular layup nozzle (102) of the apparatus (100) according to the present invention. The cold end portion (110) is configured to keep the fiber material cool and prevent said material from prematurely melting away from the output nozzle (108). The cold end portion (110) comprises a coolant source (not shown), core (112), casing (113), coolant inlet (114) and coolant outlet (115).

The coolant source (not shown) contains coolant at an optimal condition, for example, appropriate temperature, pH, and purity. The coolant enters the hot end portion (116) through the coolant inlet (114) and exits through the coolant outlet (115) after flowing around the core (112). Those skilled in art will appreciate that higher surface area contact with the coolant is required for effective heat transfer. In an embodiment, the coolant may be any fluid with high heat capacity. Preferably, the coolant is liquid instead of air which is used in most conventional configurations. The use of liquid coolant allows for higher extrusion temperatures to be obtained. Further, the coolant source (not shown) is configured to maintain the required coolant flow rate say for example by the use of a control mechanism (i.e a flow control valve). The cold end portion (110) that is configured to remove heat from the coolant, may be an active or passive system to maintain a lower coolant temperature, which may include radiators, thermoelectric coolers etc.

In an embodiment, the core (112) is a helical core (112), i.e., the core (112) is helical shaped, as shown in FIG. 3A. It is conceivable that the helical core (112) comprises channels (117) having a geometry that allows helical flow to the coolant to ensure a high area of contact and high residence time for the coolant liquid to absorb maximum heat thereby increasing the efficiency of cooling. Furthermore, the helical cooling ensures the material stays within or below the melting point at any part above the heat block (118). In an embodiment, outside of the core (112) is configured to serve as passage for coolant flow to maintain low temperature.

In yet another embodiment, the helical core (112) comprises a connector rod (119) that is configured to connect the hot end portion (116) to the cold end portion (110) and/or material extruder (101). The connector rod (119) is configured to prevent heat transfer from said hot end portion (116) to the cold end portion (110). Preferably, the connector rod (119) is made of material with very low thermal conductivity (i.e titanium) to control the heat transfer from the hot end to the cold end portion (110). Further, parts in contact with the connector rod (119) may be made of a material with higher thermal conductivity to transfer heat effectively to the surface of the helical core (112) whereas parts in contact with the environment (i.e casing (113)) may be made of an insulating material to restrict transfer of heat from the environment.

In an embodiment, it is conceivable that the connector rod (119) and hot end portion (116) can be removed out of the modular layup nozzle (109) and a different set of connector rod (119) and hot end portion (116) can be replaced for performing layup with different widths of tape. As a result, the apparatus (100) may be used for different forms of fiber materials thereby making it more economical. Those skilled in the art will appreciate that the modular configuration of the core (112), connector rod (119) and the hot end portion (116) makes the manufacturing of the channels (117) of the core (112) for the helical flow easier and more economical. Also, it allows to use different materials for the core (112) and the casing (113).

Further, according to an embodiment of the present invention, the modular layup nozzle (109) is configured to securely mount to the material extruder (101) via the extruder mount (120, not shown) thereof with proper alignment and quick release mechanism. In an embodiment, the quick release mechanism is configured to allow for quick assembly/disassembly of the modular layup nozzle (109) for maintenance.

Figure 3B:
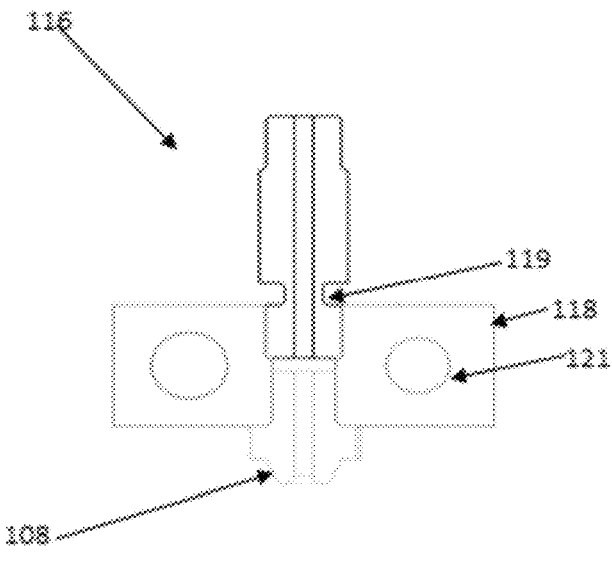
FIG. 3B illustrates an embodiment of a hot end portion (116) of the present invention.

FIG. 3B illustrates the hot end portion (116) of the apparatus (100). The hot end portion (116) comprises a heat block (118), heat source (121), temperature measuring unit (not shown), output nozzle (108), connector rod (119), ironing arrangement (124, not shown) and thermal jacket (not shown).

It is conceivable that the heat block (118) is configured to convert the fiber material into a molten form and deposit said fiber material into a composite part (134, not shown) through an output nozzle (108). The heat block (118) may be made of a material with high thermal conductivity, say for example, aluminum. The heat block (118) further includes provision for the attachment of the other hot end components.

In an embodiment, the heat source (121) in the hot end portion (116) is configured to generate heat in said heat block (118). It is conceivable that the heat source (121) is a resistance heating cartridge with enough power to take the heat block (118) to the required temperature like 450 degree Celsius for high performance materials like PEEK, ULTEM, etc. In an embodiment, the heat block (118) may be covered by a thermal jacket (not shown) that is conceived to be made of an insulating material to reduce heat loss to the environment. Those skilled in the art will appreciate that the heat block (118) may be swapped with a different material for higher thermal conductivity and for handling other varieties of temperature sensors and heating units.

It is further conceived that temperature measuring unit (not shown), preferably a thermocouple (not shown), is configured to measure the temperature in said heat block (118). It is conceivable that the thermocouple (not shown) is capable of measuring high temperatures of up to 900 degree Celsius. It is possible that the values measured by the temperature measuring unit (not shown) is forwarded to a controller which is configured to maintain the temperature within the heat block (118) in accordance to a pre-set value.

It is possible that the output nozzle (108) is configured to function as an outlet for the molten fiber material. The size and shape of the output nozzle (108) is configured to match the size and shape of the fiber material and has a diameter that is greater than the diameter of the fiber material. Further, the output nozzle (108) may be made of a thermally conductive material (i.e. brass for uniform heating) and with high hardness (i.e. stainless steel) for greater wear resistance. In another embodiment, the output nozzle (108) may be swapped to handle different fiber types, size and cross section.

Figure 3C:
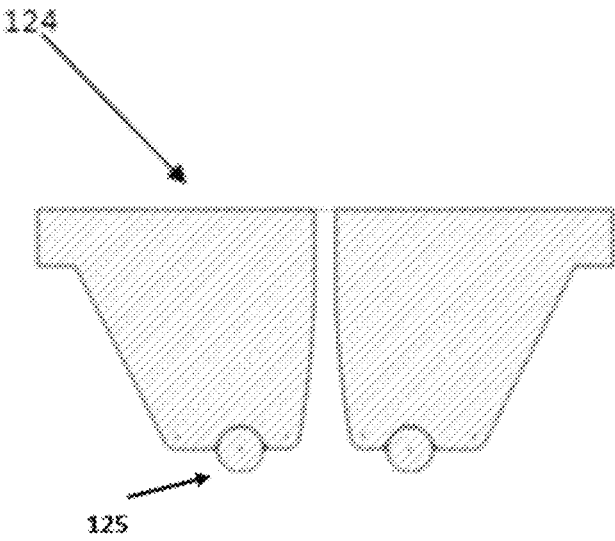
FIG. 3C illustrates an embodiment of an ironing mechanism (124) of the present invention.

FIG. 3C shows an ironing mechanism (124) of the present invention. In a preferred embodiment of the present invention, the hot end portion (116) comprises an ironing mechanism (124) comprising a spherical-profiled attachment (125) disposed at the end of the output nozzle (108), said spherical-profiled attachment (125) is configured to press the fiber material during extrusion and dispensing thereof. As a result, smooth flow of the fiber material during extrusion process and greater adhesion to underlying layers are achieved. Furthermore, the spherical-profiled attachment (125) comprises a set of spherical balls arranged in a radial fashion along the output nozzle (108) and are held together in a cage (not shown) machined into said output nozzle (108). Such configuration takes into account the effects of thermal expansion due to heating. In an embodiment, the ironing mechanism (124) can be selectively hardened in order to increase the life of the output nozzle (108).

In another embodiment, the apparatus (100) further comprises a follower roller (not shown) configured to apply pressure to the deposited fiber material in order to compact said fiber material onto previously deposited fiber materials. This helps in removing any air voids that are caused during the layup. Also, this produces better adhesion with the previous layup resulting in a higher interlayer shear strength of the produced part thereby reducing delamination failures.

Figure 3D:
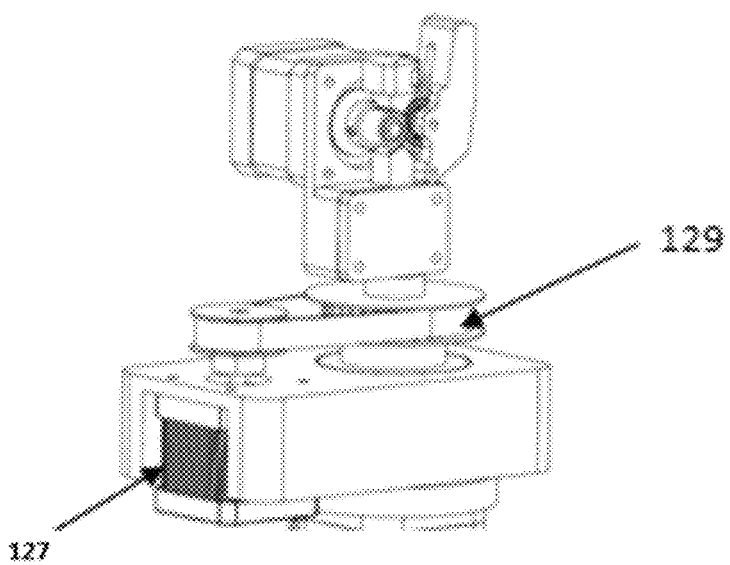
FIG. 3D illustrates an embodiment of a swivel assembly (129) of the present invention.

FIG. 3D illustrates a swivel assembly (129) of the modular layup nozzle. The swivel assembly (129) comprises a swivel motor (127) that allows for various movement of the output nozzle (108), say for example turn, spin, rotate or pivot around a defined axis. This helps in aligning the fibers in the direction of layup and avoids any twisting of the fibers during fiber steering.

Figure 4A:
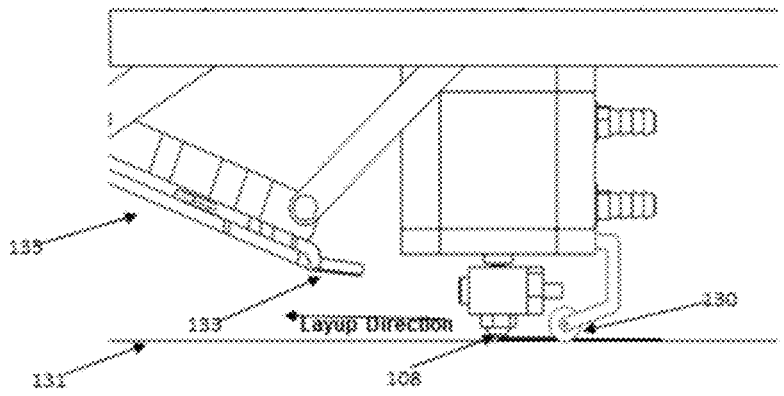
FIG. 4 illustrates an embodiment of a leading heat element (130) of the present invention.
Figure 4B:
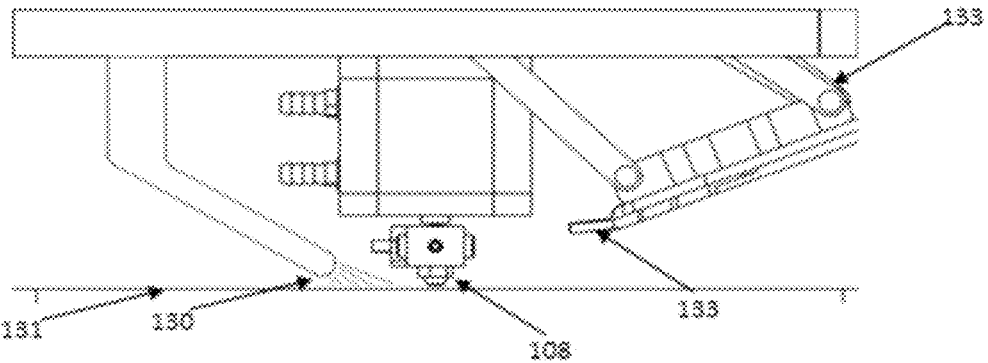
Figure 4C:
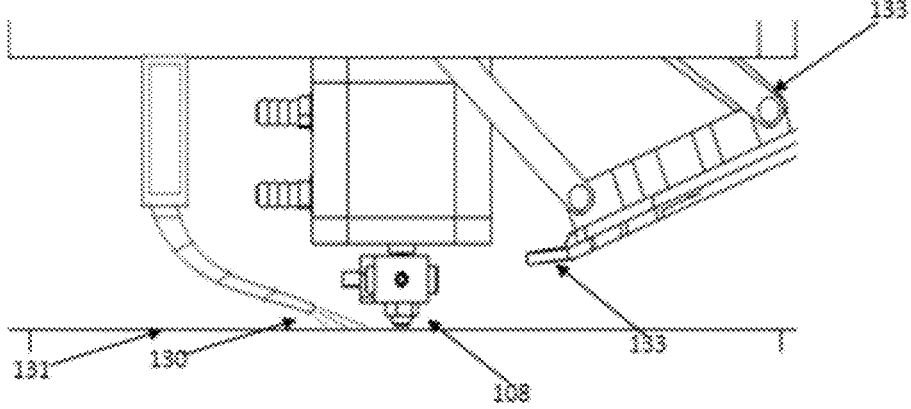

FIG. 4A-4C illustrates a leading heat element (130) mounted on a leading side of a layup direction. This leading heat element (130) is configured to soften a fiber material that is previously deposited on the surface (131) thereby promoting adhesion of a newly deposited fiber material over it. The leading heat element (130) may comprise a hot gas pipe or an infrared heater placed close to the output nozzle (108). The apparatus (100) can be rotated about the axis of the output nozzle (108) to keep the leading heat elements (130) oriented so that they are always leading along the layup direction.

As illustrated in FIG. 4A, the leading heat element (130) is configured to soften a fiber material that is previously deposited on the surface (131). The apparatus (100) can be rotated about the axis of the output nozzle (108) to keep the leading heat elements (130) oriented so that they are always leading along the layup direction.

As illustrated in FIG. 4B the leading heat element (130) may include a hot gas pipe or an infrared heater placed close to the output nozzle (108). The apparatus (100) can be rotated about the axis of the output nozzle (108) to keep the leading heat elements (130) oriented so that they are always leading along the layup direction.

As illustrated in FIG. 4C, the fiber material is fed into the output nozzle (108) using the material extruder (101) in engaged position. Said material extruder (101) continues to feed the fiber material into the output nozzle (108) until the fiber material adheres to the layup surface (131).

FIG. 5A-5E illustrates the cutting assembly (103, as shown in FIG. 1) of the apparatus (100). The cutting assembly (103, as shown in FIG. 1) comprises a four-bar linkage mechanism (135) wherein one of said links is driven by a cutter actuator (not shown), possibly a rotary actuator. Furthermore, the cutting assembly (103, as shown in FIG. 1) comprises a blade or a pair of shear cutters (133) that is activated remotely through a controller (not shown). During deposit operation, the cutting assembly (103, as shown in FIG. 1) stays above the output nozzle (108), so the path is not impeded, and the underlying layers are not affected. At the end of the deposit operation, the apparatus (100) or alternatively, the output nozzle (108), moves up actuating the four-bar linkage mechanism (135) which prompts the cutting assembly (103, as shown in FIG. 1) to come below the output nozzle (108) and start the cutting operation. After the cutting operation, the four-bar linkage mechanism (135) is actuated again, and the cutting assembly (103, as shown in FIG. 1) moves back up while the excess fiber material is retracted using the material extruder (101). The apparatus (100) then moves down to resume the deposit operation.

Figure 5A:
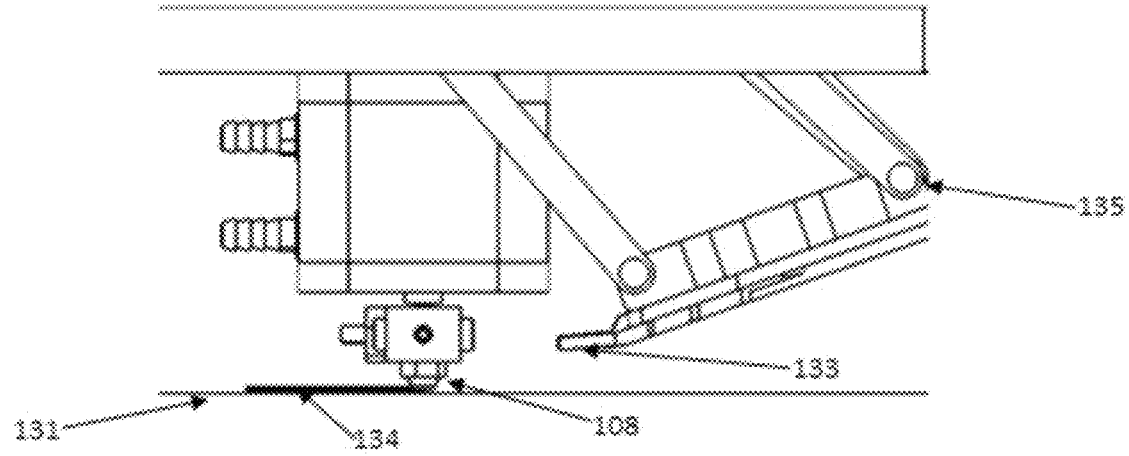
FIG. 5 illustrates an embodiment of a cutting assembly (103) of the present invention.

As illustrated in FIG. 5A, the fiber material is converted into the molten form and deposited on to the composite part 134. The cutting assembly (103, as shown in FIG. 1) may include a four-bar linkage mechanism (135) such that one of said links is driven by a cutter actuator (not shown), possibly a rotary actuator. During deposit operation, the cutting assembly (103, as shown in FIG. 1) stays above the output nozzle (108), so the path is not impeded, and the underlying layers are not affected.

Figure 5B:
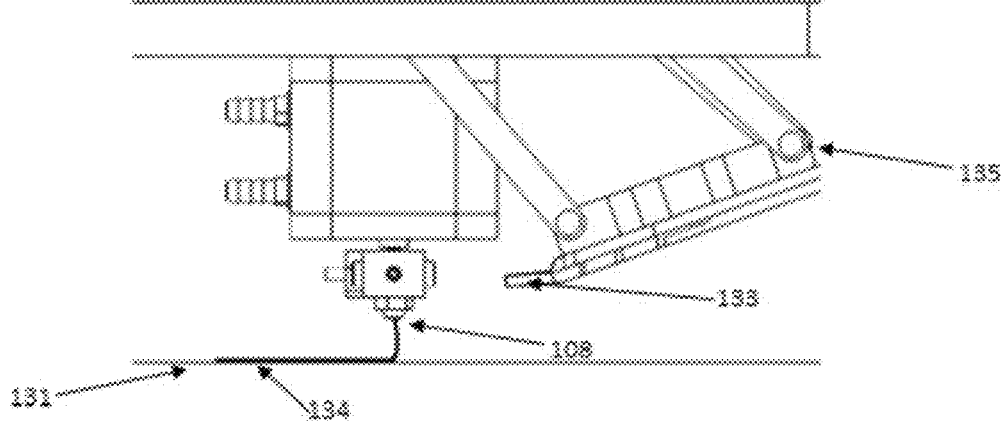

As illustrated in FIG. 5B, the apparatus (100) or alternatively, the output nozzle (108), may move up actuating the four-bar linkage mechanism (135) which prompts the cutting assembly (103, as shown in FIG. 1) to come below the output nozzle (108) and start the cutting operation.

Figure 5C:
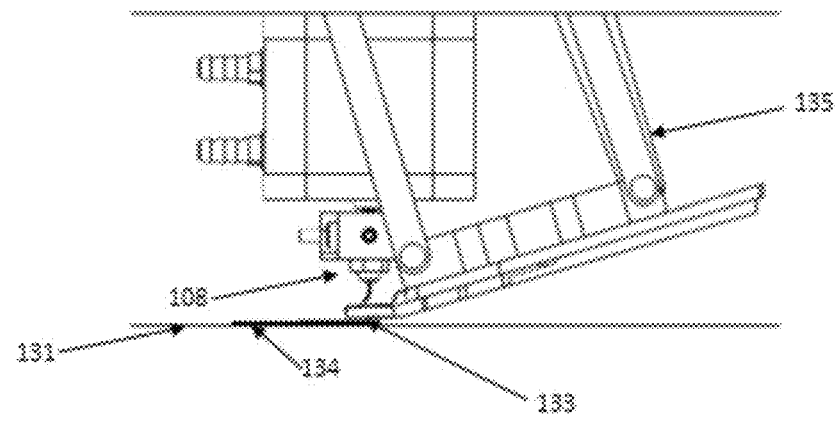
Figure 5D:
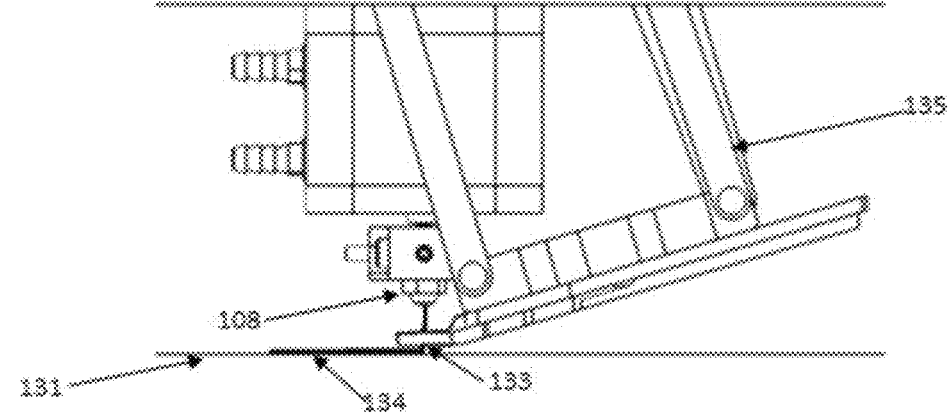

As illustrated in FIGS. 5C and 5D, the cutting assembly (103, as shown in FIG. 1) may include a blade or a pair of shear cutters (133) that is activated remotely through a controller to perform the cutting operation.

Figure 5E:
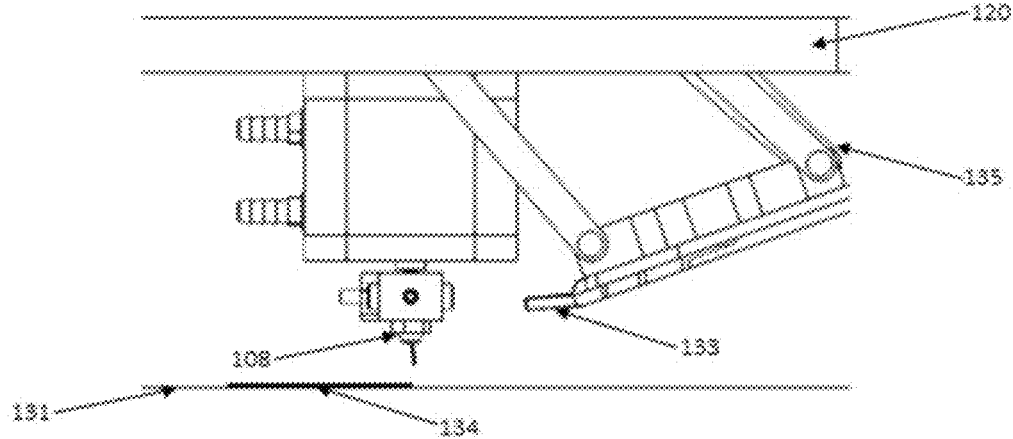

As illustrated in FIG. 5E, after the cutting operation, the four-bar linkage mechanism (135) is actuated again, and the cutting assembly (103, as shown in FIG. 1) moves back up while the excess fiber material is retracted using the material extruder (101).

Figure 6A:
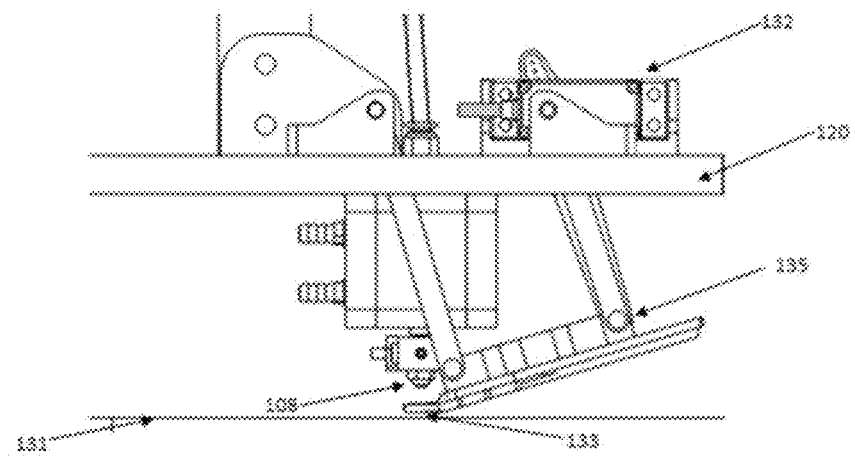
FIG. 6A-6B illustrates an assembly for depositing fiber material to a surface (131) according to the present invention
Figure 6B:
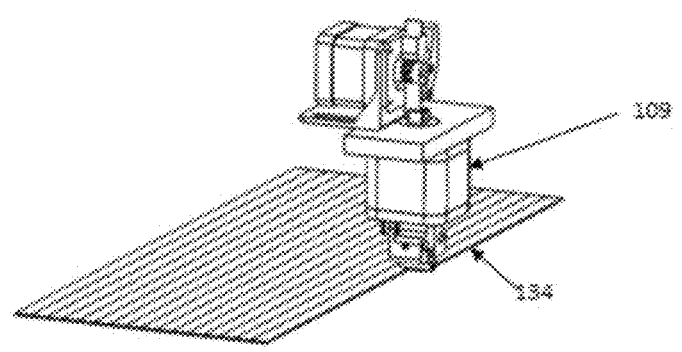

FIG. 6A-6B illustrate an assembly for depositing fiber material onto a surface (131) according to the present invention. The assembly according to the present invention comprises said material extruder (101), modular layup nozzle (109) and cutting assembly (103, as shown in FIG. 1) being secured in said extruder mount (120). The material extruder (101) is secured on a top surface of the extruder mount (120) whereas the modular layup nozzle (109) is secured on a bottom surface of the extruder mount (120). The cutting assembly (103, as shown in FIG. 1) is preferably secured on a side of the top surface of the extruder mount (120). The assembly is also provided with a layup surface (131) situated at a distance below the modular layup nozzle (109). The layup surface (131) functions as a surface where the fiber material is to be deposited by the modular layup nozzle (109). The modular layup nozzle (109) is configured to be movable along the entire area of the build surface (131) to deposit the fiber material.

Figure 7:
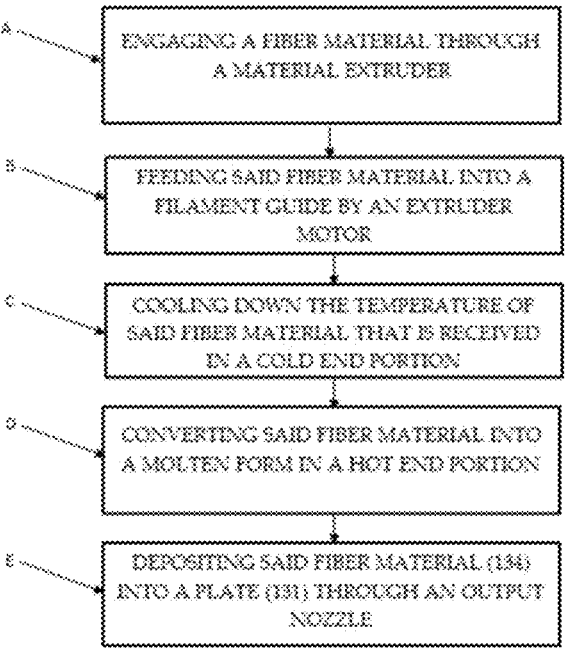
FIG. 7 illustrates a process for depositing fiber material according to the present invention.

FIG. 7 illustrates the process according to the present invention. The invention also relates to a process for depositing fiber material onto a surface (131). The process according to the present invention comprises the steps of:

a) engaging a fiber material through a material extruder (101);

b) feeding said fiber material into a filament guide by an extruder motor (105); c) cooling down the temperature of said fiber material that is received in a cold end portion (110);

d) converting said fiber material into a molten form in a hot end portion (116); and e) depositing said fiber material on a layup surface (131) through an output nozzle (108).

The process according to the present invention experiences the same benefits derived from the corresponding apparatus (100) according to the present invention. In an embodiment, toolpaths are generated by feeding tessellated models of a desired model to a slicing software. These toolpaths are fed into a controller which then sends signals to all the electronic devices in the apparatus (100). Once the modular layup nozzle (109) moves to the desired position, the fiber material is fed to the output nozzle (108) using the material extruder (10) 1) for starting the deposit operation. The fiber material is fed into the output nozzle (108) using the material extruder (101) in engaged position. Said material extruder (101) continues to feed the fiber material into the output nozzle (108) until the fiber material adheres to the layup surface (131). The melted fiber material, having been extruded from the outlet nozzle (108), is pressed onto the layup surface (131) using the ironing mechanism (124). Once adhesion is ensured, the extruder motor (105) is disengaged to allow for smooth flow of fiber material, thereby eliminating any possibilities of a mismatch in tension.

In an embodiment, at least one output nozzle (108) are used. In this embodiment, two nozzles may be used, one for purely thermoplastic material and the other for fiber reinforced thermoplastic material. Alternately, one embodiment may also involve the injection of thermoplastic material into the nozzle through an entry point in the hot end portion (116) where the output nozzle (108) is attached. The provision of thermoplastic material is conceived to vary the volume fraction of carbon fiber in the fiber reinforced part. Preferably, for optimal adhesion to the layup surface (131), a base layer of the thermoplastic material is deposited first before the fiber reinforced filament is laid. At the end of each deposit operation, the output nozzle (108) moves up, then the material extruder (101) gets engaged and then the cutter assembly (103) moves down to cut the fiber material and then moves back up after cutting the fiber material. After cutting operation, the material extruder (101) retracts the excess fiber material, the output nozzle (108) moves back-down and deposit operation is continued.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus (100) for depositing a fiber material onto a surface (131), the apparatus (100) comprising:
   a material extruder (101) comprising a switchable clutching mechanism, an extruder motor (105), and a filament guide (106), wherein the switchable clutching mechanism is configured to (i) engage the fiber material with the extruder motor (105) during and to initiate a deposit operation of the filament such that the extruder motor (105) is configured to feed the fiber material into the filament guide (106), and (ii) disengage the fiber material and the extruder motor (105) both during and upon completion of the deposit operation; and
   a modular layup nozzle (109) comprising:
   a cold end portion (110) configured to receive the fiber material from the filament guide (106) and cool down the temperature of the fiber material by using a coolant; wherein the cold end portion (110) comprises a helical core (112) comprising a channel (117) configured for helical flow of the coolant; and
   a hot end portion (116) comprising a heat block (118) that is configured to convert the fiber material into a molten form and deposit the molten fiber material through an output nozzle (108) to form a composite part (134).

2. The apparatus (100) as claimed in claim 1, further comprising a cutting assembly (103) configured to cut the fiber material.

3. The apparatus (100) as claimed in claim 2, wherein the cutting assembly (103) comprises a four-bar linkage mechanism having four links, wherein one of the links is driven by a cutter actuator (132).

4. The apparatus (100) as claimed in claim 2, wherein the cutting assembly (103) comprises a blade or a pair of shear cutters that is activated remotely through a controller.

5. The apparatus (100) as claimed in claim 1, wherein a cross section of the filament guide (106) has a curvilinear geometric shape.

6. The apparatus (100) as claimed in claim 1, wherein a cross section of the filament guide (106) has a polygonal geometric shape.

7. The apparatus (100) as claimed in claim 1, further comprising a heat source (121) that is configured to generate heat in the heat block (118).

8. The apparatus (100) as claimed in claim 1, further comprising a temperature measuring unit, wherein the temperature measuring unit is a thermocouple, that is configured to measure the temperature in the heat block (118).

9. The apparatus (100) as claimed in claim 1, further comprising a connector rod (119) that connects the hot end portion (116) to the cold end portion (110) and is configured to prevent heat transfer from the hot end portion (116) to the cold end portion (110).

10. The apparatus (100) as claimed in claim 9, wherein the helical core (112), the connector rod (119) and the hot end portion (116) are configured to form the modular layup nozzle (109).

11. The apparatus (100) as claimed in claim 10, wherein the modular layup nozzle (109) is swappable with a different modular layup nozzle for performing a layup with different widths of fiber materials.

12. The apparatus (100) as claimed in claim 1, further comprising an ironing mechanism (124) comprising a spherical-profiled attachment (125) disposed at the end of the output nozzle (108), wherein the spherical-profiled attachment (125) is configured to press the fiber material during an extrusion process and a dispensing process of the fiber material.

13. The apparatus (100) as claimed in claim 12, wherein the spherical-profiled attachment (125) comprises a set of spherical balls arranged in a radial fashion along the nozzle and are held together in a cage machined into the nozzle.

14. The apparatus (100) as claimed in claim 1, further comprising a thermal jacket that is configured to cover the heat block (118).

15. The apparatus (100) as claimed in claim 1, further comprising a follower roller configured to apply pressure to the deposited fiber material in order to compact the fiber material onto a previously deposited fiber material.

16. The apparatus (100) as claimed in claim 1, further comprising a leading heat element (130) mounted on a leading side of a layup direction of the fiber material and configured to soften a fiber material deposited previously on the surface (131).

17. The apparatus (100) as claimed in claim 16, wherein the leading heat element (130) comprises a hot gas pipe or an infrared heater.

18. The apparatus (100) as claimed in claim 1, wherein the clutching mechanism is configured to be remotely operated through a controller.

19. The apparatus (100) as claimed in claim 1, wherein the material extruder (101) further comprises mated extruding pulleys.

20. The apparatus (100) as claimed in claim 1, wherein the material extruder (101) is configured to operate in at least one of (i) a push mode wherein the fiber material is pushed through the nozzle, and (ii) a pull mode wherein the material extruder (101) is disengaged from the fiber material.

21. The apparatus (100) as claimed in claim 20, wherein the material extruder (101) is further configured to operate in both the push mode and the pull mode.

22. The apparatus (100) as claimed in claim 21, wherein the push mode of the material extruder (101) is further configured to push the fiber material during a cutting operation of the fiber material to release a tension in the fiber material.

23. The apparatus (100) as claimed in claim 1, wherein the cold end portion (110) further comprises a coolant source (111) containing the coolant, that is configured to cool down the temperature of the fiber material before the fiber material enters the hot end portion (116).

24. The apparatus (100) as claimed in claim 1, wherein the cold end portion (110) further comprises a coolant outlet (115) that allows exit of the coolant from the channel (117) after flowing around the core (112).

25. An assembly for depositing fiber material to a part (131), the assembly comprising:
   an extruder mount to which the material extruder (101), the modular layup nozzle (109), and the cutting assembly (103) of the apparatus as claimed in claim 2 are each secured; and a part (131) secured at a distance below the modular layup nozzle.

\* \* \* \* \*